No. 807,428.  
PATENTED DEC. 19, 1905.  
R. M. BAMFORD.  
COFFEE URN.  
APPLICATION FILED APR. 18, 1904.
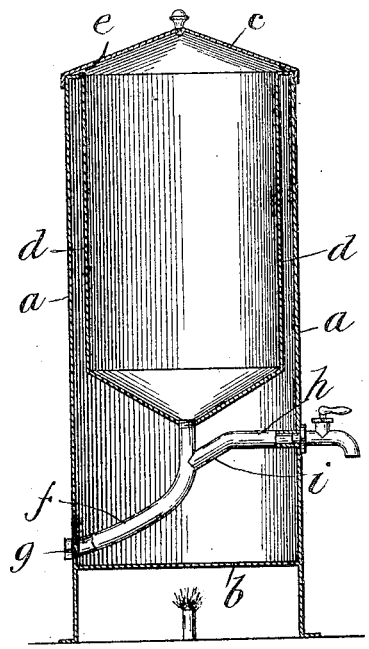

UNITED STATES PATENT OFFICE.

ROBERT M. BAMFORD, OF CHICAGO, ILLINOIS.

COFFEE-URN.

No. 807,428.

Specification of Letters Patent.

Patented Dec. 19, 1905.

Application filed April 18, 1904. Serial No. 203,553.

*To all whom it may concern:*

Be it known that I, ROBERT M. BAMFORD, a citizen of the United States, residing at Chicago, in the county of Cook and State of Illinois, have invented certain new and useful Improvements in Coffee-Urns, of which the following is a specification.

My invention relates to coffee-urns for use in hotels, restaurants, and similar locations, and relates especially to an arrangement and construction of parts whereby all settlings, sediment, &c., are prevented from being drawn off with the coffee or other beverage and whereby the device may be readily and easily cleansed.

In the accompanying drawing the figure represents a section of a coffee-urn or similar vessel provided with my improvement and illustrates an exemplification of my invention as applied to this class of devices.

Referring to the drawing, the reference-letter $a$ indicates the outer casing of a suitable coffee or tea urn, such as are now generally used in hotels, restaurants, and similar places, the same being generally in the form of an upright cylinder. The casing is provided near its lower end with the usual bottom wall or partition $b$ and is supported at its lower end in any suitable manner now well understood. The upper open end of the casing or cylinder is closed by a suitable cover $c$. Within the outer casing a suitable inner casing $d$ is supported in any desired manner, preferably by having a top flange $e$ extending outwardly around its open upper end and adapted to rest upon the top edge of the outer casing $a$. The inner casing $d$ constitutes the chamber or receptacle in which the tea, coffee, or other beverage is made and preferably is somewhat smaller in cross-section or diameter than the outer casing $a$ in order to provide a suitable intermediate water-jacket between the two shells. The inner receptacle $d$ is of the usual shape and size to fit within the outer casing in the manner now well understood in the art, and its lower portion is tapered or cone-shaped and preferably terminates in a suitable discharge-outlet, as shown in the drawing, at its apex. The outlet is provided with a suitable pipe $f$, which leads out through the outer casing, where it is provided with a suitable plug or cap $g$, which may be readily attached thereto and detached therefrom. The outlet-pipe is tapped at any suitable point in its length by a draw-off pipe $h$, which also projects through the outer casing and terminates in the usual faucet-like construction, as shown in the drawing, for the purpose of drawing the tea, coffee, or other beverage. The draw-off pipe $h$ may connect with the pipe $f$ in any suitable manner; but I prefer to form the inner end of the pipe $h$ with a downwardly-inclined pitch or section—as shown, for example, at $i$—the purpose of this construction being to prevent any settlings or foreign substance to pass into the draw-off pipe when the device is in use.

In practice the water-jacket between the shells or casings is filled and a suitable flame is applied beneath the receptacle, as shown in the drawing, for the purpose of heating the water in the jacket. The tea, coffee, or other material to be prepared is placed within the inner chamber or receptacle, this material usually being confined within a cloth bag, together with the necessary amount of water to be employed, and the prepared beverage is then drawn off as occasion requires through the faucet. In the event the bag bursts or for other reason sediment or foreign substance gets into the inner chamber or receptacle the grounds, settlings, and other sediment will pass down into the outlet-pipe $f$, from which they may be readily withdrawn when the cap or plug is removed, and none of this foreign material will be drawn off through the faucet by reason of its lodgment within the passage through the outlet-pipe. The pitch or inclination of the draw-off pipe, as at $i$, serves in this connection to insure against the passage of any foreign substance through the faucet with the beverage.

In addition to the advantages which are apparent from the above description it is obvious that by the construction here shown and described I provide a device of this class which is readily and easily cleaned or washed. It will be seen that by removing the plug or cap of the outlet-pipe $f$ water will freely and unobstructedly flow through the inner chamber, which on account of its shape permits of the water to freely flow through from end to end.

In the present construction in case the bag holding the coffee, tea, &c., shall burst the material may be readily withdrawn through the outlet-pipe $f$ without in any manner clogging the draw-off pipe. For this reason my construction is advantageous over other devices, in which in such case it is necessary to dip the contents out of the receptacle and the draw-off pipe is clogged.

Having described my invention, what I desire to secure by Letters Patent and claim is—

In a device of the class described, in combination, an outer receptacle having a bottom, an inner receptacle supported by the outer receptacle and provided with a substantially cone-shaped bottom terminating in a discharge-outlet, a downwardly-extending outlet-pipe connected to the discharge-opening and passing through the wall of the outer receptacle and having a closing-cap at its outer end, and a horizontal draw-off pipe passing through the wall of the outer receptacle and having a downwardly-inclined portion connecting with the outlet-pipe near and below the discharge-opening of the inner receptacle, and a controlling-cock for the draw-off pipe.

In testimony whereof I affix my signature in presence of two witnesses.

ROBERT M. BAMFORD.

Witnesses:
 ELIZABETH MOLITOR,
 J. McROBERTS.